United States Patent
Held et al.

(10) Patent No.: US 11,927,927 B2
(45) Date of Patent: Mar. 12, 2024

(54) COMPUTER IMPLEMENTED METHOD OF AND OPTIMISATION TOOL FOR REFINEMENT OF LASER CUTTING PROCESSING PARAMETERS BY MEANS OF AN OPTIMIZATION TOOL

(71) Applicant: BYSTRONIC LASER AG, Niederönz (CH)

(72) Inventors: Michael Held, Heimiswil (CH); Dario Piga, Lugano (CH); Loris Roveda, Lugano (CH); Alessio Benavoli, Naas (IE); Luca Maria Gambardella, Massagno (CH)

(73) Assignee: BYSTRONIC LASER AG, Niederönz (CH)

( * ) Notice: Subject to any disclaimer, the term of this patent is extended or adjusted under 35 U.S.C. 154(b) by 0 days.

(21) Appl. No.: 18/026,846

(22) PCT Filed: Aug. 18, 2021

(86) PCT No.: PCT/EP2021/072891
§ 371 (c)(1),
(2) Date: Mar. 17, 2023

(87) PCT Pub. No.: WO2022/058113
PCT Pub. Date: Mar. 24, 2022

(65) Prior Publication Data
US 2023/0259079 A1 Aug. 17, 2023

(30) Foreign Application Priority Data

Sep. 18, 2020 (EP) .................................. 20196972

(51) Int. Cl.
*G05B 13/04* (2006.01)
*B23K 26/38* (2014.01)
*G06N 7/01* (2023.01)

(52) U.S. Cl.
CPC ............ *G05B 13/042* (2013.01); *B23K 26/38* (2013.01); *G06N 7/01* (2023.01)

(58) Field of Classification Search
CPC .................................................... G05B 13/042
(Continued)

(56) References Cited

U.S. PATENT DOCUMENTS 6,345,205 B1  2/2002  Inamasu et al.
9,718,239 B2 * 8/2017  Huang .................. B29C 64/268
(Continued)

FOREIGN PATENT DOCUMENTS

| CN | 109085752 A | 12/2018 |
| EP | 2169491 A1 | 3/2010 |
| EP | 2687317 A1 | 1/2014 |

OTHER PUBLICATIONS

International Preliminary Report on Patentability for PCT/EP2021/072891—OEE Workproduct for PPH Request.
(Continued)

*Primary Examiner* — Hien D Khuu
(74) *Attorney, Agent, or Firm* — BelayIP

(57) ABSTRACT

The present disclosure relates to a method of calculating process parameters. which are optimized for processing a workpiece with specific material properties by means of a laser machine, comprising the method steps of: determining material properties for which the process parameters should be optimized; determining preconfigured initial process parameters; executing a re-optimization algorithm until a target objective function is minimized or maximized for calculating optimized material-specific process parameters by accessing a storage with a statistical model, wherein the statistical model is based on Bayesian optimization using Gaussian Processes as priors.

14 Claims, 8 Drawing Sheets

(58) Field of Classification Search
USPC .......................................................... 700/29
See application file for complete search history.

(56) References Cited

U.S. PATENT DOCUMENTS

| | | | | |
|---|---|---|---|---|
| 10,279,444 B2* | 5/2019 | Santner | ................ | G05B 19/182 |
| 2011/0046766 A1* | 2/2011 | Mienhardt | ......... | G05B 19/4083 |
| | | | | 700/103 |
| 2013/0184839 A1* | 7/2013 | Bauer | ................... | G05B 15/02 |
| | | | | 700/83 |
| 2015/0165549 A1* | 6/2015 | Beutler | ................ | B23K 26/032 |
| | | | | 219/121.83 |
| 2019/0283184 A1* | 9/2019 | Zhang | ................... | B23K 26/00 |
| 2020/0240257 A1 | 7/2020 | Madasu et al. | | |
| 2020/0398550 A1* | 12/2020 | Dave | ...................... | H01L 22/12 |

OTHER PUBLICATIONS

EP2169461A1 English language translation.
CN109085752A English language translation.
EP2687317A1 English language translation.

* cited by examiner

COMPUTER IMPLEMENTED METHOD OF AND OPTIMISATION TOOL FOR REFINEMENT OF LASER CUTTING PROCESSING PARAMETERS BY MEANS OF AN OPTIMIZATION TOOL

CROSS REFERENCE TO RELATED APPLICATIONS

This application is a national phase application of International Application No. PCT/EP2021/072891, filed Aug. 18, 2021, which claims priority to European Patent Application 20196972.2, filed Sep. 18, 2020, the content of both of which is herein incorporated by reference.

BACKGROUND OF THE INVENTION

Field of the Invention

The present invention is within the field of high-power processing, like laser cutting, and in particular relates to a method, tool and product for calculating process parameters which are optimized for a specific material which is to be processed.

Description of Related Art

Laser processing, in particular laser cutting, is a complex process which needs setting of a plurality and a large variety of different process parameters in order to achieve the required quality and other requirements (like efficiency and robustness) of the processed parts.

Generally, the setting of process parameters refers to physical and mechanical parameters which usually show high interdependencies. Thus, the process of finding the appropriate parameters is a highly demanding and complex task. Typically, in control systems for a laser process, testing different combinations of process parameters involves running a real closed-loop experiment, which is time consuming and costly. Therefore, usually the function to calculate the target quality/result from process parameters and vice versa is not known or expensive to compute.

In state of the art, approaches are known to automatically calculate process parameters, based on stored (i.e. hard-coded) expert knowledge and/or on sensor data. For example, U.S. Pat. No. 9,529,343 discloses a proposal for optimized cutting parameter calculations by means of stored expert knowledge, machine sensor data or image data of the cut parts.

However, on the one hand, a disadvantage of these approaches is that the expert knowledge is not or not totally applicable to and thus not valid for slightly different settings, wherein for example the material to be processed is not identical (e.g. different material thickness or different material composition) or the machine shows another setting or equipment (e.g. another laser head, another operating mode). Thus, the stored expert knowledge is rendered useless.

On the other hand, it is very valuable and precious information if once, optimized process parameters have been determined for a certain process, that this information can be considered when calculating "new" process parameters for a "new" setting or "new" materials or a "new" type of laser machine. "New" in this context relates to the fact that no prior knowledge or no prior experiments do exist.

Further, it is known in state-of-the-art use neural networks or tools from artificial intelligence in order to determine optimized process parameters. For example, WO 2020/069889 discloses an algorithm for calculating a recommendation for optimal process parameters for control of a laser processing machine. The algorithm is based on machine learning in order to process input data, representing material property data and a target quality, into the output data with a recommendation of optimized process parameters, here: cutting parameters.

However, these, AI—based approaches require a resource intensive training and test phase, in which the neural network is trained and tested for a specific task, like cutting a particular type of material (with a certain thickness and certain composition) with a particular type of laser machine. So, AI-based approaches would need much more experiments (i.e., time and costs) in order to create a reliable model, valid in the complete parameter domain (i.e., also in loss of cut regions, not useful for optimization).

The problem arises if slightly different material compositions or a slightly different material thickness is to be processed. Then, the calculated process parameters are no longer valid and may lead to deficiencies in the process result (e.g. less quality).

Therefore, there is a need in the art to provide a method and tool which is able to automatically calculate process parameters, which are material specific and machine specific in short time and without the need to train neural network model. Further, evaluation of the process result should be made more reliable and should no longer depend on the personal assessment of the complete set all prior experiments by the user.

This object is solved by the appended independent claims. Advantages, improved embodiments and alternatives are described in the dependent claims and in the following description.

According to a first aspect the present invention relates to a computer-implemented method (application to be executed on a computer related to control the laser process) for calculating process parameters, in particular cutting parameters, which are optimized for processing, in particular, cutting, a workpiece with specific material properties by means of a laser machine, having specific machine properties, comprising the method steps of:

Determining material and/or machine properties for which the process parameters should be optimized;

Determining preconfigured initial process parameters, in particular based on determined material properties;

Re-defining a parameter domain for a re-optimization algorithm based on determined preferences. When considering the user defined preferences, it is possible to base the domain for re-optimization exploiting an acceptability classifier, expanding the parameters range from the optimal point(s) until the selected qualities are not anymore acceptable;

Executing a re-optimization algorithm until a target objective function is minimized or maximized (optimized) for calculating material-specific and/or machine-specific process parameters, being optimized, by accessing a storage with a statistical model, wherein execution of the re-optimization algorithm comprises:

Controlling execution of test processes with the determined preconfigured initial process parameters;

Evaluating the test processes by using a measurement-based algorithm or a preference-based algorithm for determining preferences for the test processes.

The "determined preferences" may be construed as optimization criteria which may be determined from the group consisting of performance, quality, energy consumption and others. The preferences preferably are input on a human machine interface, HMI. Thus, the optimization criteria may be customized by user input received on the HMI for each laser process specifically. For example, in a first setting, quality is selected as key optimization criteria and the re-optimization algorithm is based thereon, whereas in a second setting, performance is selected as key optimization criteria and the re-optimization algorithm is adapted accordingly and based on optimizing performance and accordingly different calculated process parameters are calculated. The determined preferences may relate to material and/or machine properties which have been determined in a preceding step, in particular by user input.

The optimization method and/or the optimization tool according to the suggestion presented herein may thus transform preconfigured initial process parameters (which may e.g. be standard settings) into optimized material-specific process parameters, being specific for the very material with very material properties which needs to be processed with the very laser machine under the actual process conditions. Material properties may e.g. relate to a material thickness or to a particular material composition (e.g. alloy). By using an approach, based on Bayesian optimization, the number of required experiments is limited, focusing on an optimal area for finding an optimum. This is, in particular in contrast to AI-based approaches, using neural networks, where a huge set of experiments is needed for providing labeled data.

The present invention relates to a closed loop control for determining re-optimized process parameters for a laser process by taking into account material and/or process specifics or properties. The closed-loop control for determining the re-optimized process parameters is executed in a calibration phase, which precedes an operating phase for productive laser processing, e.g., for executing a cutting plan. The calibration phase is based on a (reduced) set of test cuts before the real laser process is started. In this calibration (time) phase, test cuts are executed which are evaluated and serve for dynamically or iteratively generating a statistical model. The control loop is "closed" in this calibration phase by providing the feedback of the evaluations of the test cuts back to the statistical model in an iterative process. This is in contrast to an open loop control, where only the parameters are calculated and then set.

After finalizing the calibration procedure, the process shifts from the calibration phase to the "normal" operation phase, which may be executed in an open loop control by using the result of the re-optimization algorithm with the set of calculated re-optimized process parameters. In still another embodiment, the operation phase may be controlled in a closed loop manner, too, by online assessment of the test cuts by means of a sensor unit, e.g., in the form of an in-process camera or optical entity, attached within a processing head of the laser and configured for acquiring images of the process (e.g., cutting surface, cut edge).

Thus, in a preferred embodiment, the process comprises:
1. A closed loop control in the calibration phase by executing test cuts and
2. An open loop control in the operation phase by using the result of the re-optimization algorithm with the set of calculated re-optimized process parameters of phase 1. Alternatively, the operation phase may be closed loop controlled by using online process sensors.

The laser process may preferably be a high-power laser process, in particular a laser cutting process and correspondingly the process parameters are cutting parameters for the cutting process. The suggested method may however also be applied to other types of laser processes, for example such with lower power, e.g. engraving processes.

Process parameters are physical or technical parameters which characterize the laser process. The process parameters may comprise a feed rate of the laser head/speed, laser power, focal position, gas pressure, gas temperature, nozzle type, nozzle clearance height etc. but may also relate to the mechanical actors and drives for the laser head and related components of the laser machine. Process parameters may, thus, comprise laser machine parameters.

Preconfigured initial process parameters are a selection of process parameters which have been evaluated (by means of having executed cuts with these process parameters in earlier times) to be best suitable or optimal for certain material properties and/or certain processes and/or certain laser machines. The preconfigured initial process parameters serve as generic parameter set for a variety of typical (in particular: cutting) processes. However, the preconfigured process parameters are typically not or not perfectly configured and adapted to the actual specific material properties of the workpiece to be processed and/or not adapted to specific processing environment (laser machine type, . . . ). Thus, the preconfigured process parameters may be material agnostic. Thus, the preconfigured process parameters are nonspecific for a certain type of material and/or material thickness, respectively. The preconfigured process parameters may be provided based on previous "experiments". The term "experiments" in this context relates to execution of test processes, such as in particular test cuts with related evaluations of the test cutting results (e.g. in terms of quality, productivity etc.). The preconfigured process parameters are usually provided for a typical workpiece to be processed and therefore relate to "usual" materials with usual material properties. Typically, the material properties may change from workpiece to workpiece. Thus, the material properties of the actual e.g. sheet metal or workpiece to be processed may not be 100% identical to the ones of the previous experiments (on which the preconfigured process parameters are based).

In still another preferred embodiment, the step of 'determining preconfigured initial process parameters' may be based on a neural network, which was trained to provide optimal process parameters for given material properties and/or machine properties which are similar to the ones to be processed. However, it has to be mentioned that the re-optimization algorithm for re-optimizing the process parameters in not based on a neural network.

In another preferred embodiment, however, the re-optimization algorithm is a stochastic model. The re-optimization algorithm preferably does not use a neural network.

According to another preferred embodiment, a statistical model (based on a limited set of experiments) is generated which is updated and improved in an iterative process by taking into account the evaluations of the test processes.

Test processing may preferably be executed in an upstream process before the real or actual processing. Test processing may preferably comprise a set of test processes, in particular test cuts. The test cuts may be in the range of 10 to 20 test cuts. Preferably, the result of each test cut is evaluated. The result of this evaluation is fed back to the re-optimization algorithm, in particular for adapting the surrogate function. In turn, the re-optimization algorithm uses this evaluation for refinement of calculated material-specific and/or process-specific process parameters. This process of 'test processing—evaluation of test processing—refinement of process parameters (=execution of the re-optimization algorithm)' is executed iteratively until an objective function is optimized. The re-optimization algorithm with the test processing will preferably take 20-30 minutes.

Evaluating the test processes (in particular: cuts) refers to judging a process result of the processed part and may in particular relate to determining a quality measure. The quality measure is standardized and quantified. For this purpose, a metric, namely a quality assessment metric is generated, which may be based on different sensor data (optical, acoustical, temperature, etc.). The result of the assessment may be represented by a set of numeric values. Evaluating the test cuts may be executed manually (visually, tactile) or automatically. The result of the manual evaluating is an input signal sequence received via a human machine interface, HMI. Determining a quality measure automatically may preferably be based on sensor signals. The sensors may include a diode and/or camera. The camera may be an in-process camera. The diodes may be either arranged coaxially or off-axially to the laser beam. In case the evaluation of the test cuts is executed manually, a preference-based algorithm is executed. For this purpose, a specific input pattern on an HMI is provided which allows to input the optimization criteria or preferences in a structured form. It is to be noted that the input signal sequence relates to a qualitative assessment or judgement, and not to a quantitative assessment. Preferences can be expressed in terms of comparison between two processed workpieces (such as "workpiece A is better/equal/worse than workpiece B"). Alternatively or in addition a multiple-star rating, in particular a five-star rating among a set of workpieces may be applied. In the latter, preferences among the rated workpieces are uniquely determined and are forwarded to the system for further processing. In case the evaluation of the test cuts is executed automatically, a measurement-based algorithm is executed.

The re-optimization algorithm serves to calculate material property specific process parameters, which thus are optimized for a particular type of material (e.g. thickness and/or composition) and/or for a particular type of processing environment, like the processing machine (e.g. laser operating mode, laser type). For limiting the parameter domain, the re-optimization algorithm may be based on preconfigured test process parameters, which have been determined to be optimal for a similar but deviating processing environment or setting, like inter alia similar thickness of the material, similar material composition, and/or similar processing constraints. Due to the fact that the parameter domain already has been limited e.g., by selecting "optimal" test process parameters for similar but not identical environments and/or settings (e.g., similar thickness), the algorithm is called "re-optimization". The initial process parameters, which have been determined to be optimal are further optimized and thus "re-optimized" with respect to process and material properties and based on evaluations of test cuts.

The re-optimization algorithm, therefore, exploits the robust optimal point computed—or provided as pre-computed in a first step—for a similar process/setting, which may serve as so called preconfigured initial process parameters, e.g. similar material properties, like material thickness, material type). The possibility to select n optimum points (sufficiently spaced apart) is available. In particular, box(es) centered at the selected point(s) is expanded until acceptable cutting performance is guaranteed for all the points in the box. This allows to restrict the optimization parameters domain for the re-optimization. In particular, an updated Gaussian Process-based model may be computed with a few initial random samples (e.g., 5 initial samples) belonging to the re-optimization domain, and may be iteratively updated while performing re-optimization, based on a single experiment or a batch of experiments (e.g., 5 to 10 samples) Generally, only the optimal point from the first step (see above) is used to deduce the spans of the input variables in the subsequent second step. Data coming from previous experiments (e.g., with different thickness, materials properties or on different machines) can be used to build a prior model for the statistical model, which is refined once data from the new experimental setting are acquired.

The re-optimization algorithm (or refinement procedure) can be exploited in the case that an optimum set of preliminary process parameters for similar material properties is already available (e.g., a similar workpiece, like a plate has been already optimized, or the same plate has to be processed on a different machine). The optimization procedure or re-optimization procedure works in the same way as for a global optimization (namely: without a set of preliminary process parameters). The main difference is related to the shaping of the process parameter domain. In the case that an optimum set of process parameters is already available, the process parameters domain can be shaped starting from such initial set of parameters, considering a process window that varies the optimum parameters of a specified percentage (e.g., 5%). Then, in the same way for the global optimization, the computation of the optimum set of parameters can be performed.

According to a preferred embodiment, the calculated optimized material-specific process parameters—and thus the result of the method or calculations—are used for directly controlling the laser process or machine. Thus, the process parameters may comprise or may be transformed into control signals for open loop control or closed loop control to be transmitted to a controller of the laser machine for controlling the machining process, e.g. cutting process.

Generally, the control may be an open loop control (optimal parameter setting) or closed loop control (dynamically adjusting or optimizing the process parameters during laser processing). The automatic use of the calculated optimized material-specific process parameters may be triggered or initiated upon receiving a confirmation signal from a user, e.g. on a user interface. Alternatively, the confirmation signal may be provided automatically after successful execution of a verification procedure which may be based on a comparison with reference parameters.

Generally, two options are provided after execution of the test processes or test cuts for evaluating the quality of the test cuts:
1. A measurement-based algorithm, which preferably is based on BO using GP and
2. A preference-based algorithm, which preferably is based on a comparison between two or more workpieces, which both will be explained in more detail below.

The invention suggests an optimization tool or problem solver for the problem of calculating optimized process parameters P for achieving a target quality Q by taking into account the specific material properties of the e.g. sheet metal to be processed, e.g. to be cut:

$$f: P \rightarrow Q.$$

For this function $f$, the derivatives of f are neither symbolically nor numerically available, and that bounds, such as Lipschitz constants, for the derivatives of f are also usually unavailable. In laser cutting, the derivative information is unavailable, unreliable, or impractical to obtain, for instance when f is expensive to evaluate or somewhat noisy, which renders most methods based on finite differences of little or no use. Therefore, the suggestion presented herein is based on a class of derivative-free optimization, see Luis Miguel Rios Nikolaos V. Sahinidis, *"Derivative-free optimization: a review of algorithms and comparison of software implementations"* in: *Journal of Global Optimization*, November 2009 (2013) 56:1247-1293, DOI 10.1007/s10898-012-9951-y.

Thus, according to another preferred embodiment, the measurement-based algorithm is based on Bayesian Optimization, in short BO, using Gaussian Processes, in short GP. BO is a Hyperparameter Optimization technique which can use Gaussian Processes to determine its prior/posterior distribution. First a prior distribution for f is assumed, then the function $f$ is evaluated and the resultant data is used to update the prior to form the posterior distribution of f. With this posterior distribution an acquisition function is created. This acquisition function determines the next query point (the acquisition function serves for the exploration aspect—where to look next).

Specifically in laser processing a huge set of interdependent input variables or parameters are to be considered for calculating optimal process parameters. In addition, process parameters for two separate processes may be required to be provided, namely first for the laser process and second for a gas flow process of assist gas. Both processes are interacting with the material. Thus, a plurality of optimization criteria is provided (e.g. feed rate, laser power, quality assessment etc.). The optimization criteria may serve as output (of a user preference determination) and may serve as input for the re-optimization algorithm as well Thus, a trade-off is needed between the different optimization criteria, which are customizable by the operator, based on the specific process needs. Generally, for laser cutting, it is known to use an inert gas (such as nitrogen or argon) or a reactive gas (such as oxygen) as assist gas to remove the molten material. If an active or reactive gas is used, the metal material of the workpiece, for example, is burned and vaporised after it has been heated to the ignition temperature by the laser beam. The reaction between oxygen and the material of the workpiece generates additional heat that supports the cutting process. The melted liquid material, which has a low viscosity, can be removed from the cut edge or from the cutting gap by the shear forces of the gas. When cutting with an inert gas, the material of the workpiece is only melted by the laser power and can be blown out of the cutting gap by the kinetic energy of the gas stream. In a preferred embodiment the present invention also calculates re-optimized process parameters for this assist gas process, which usually is an ensemble process and integrated with the laser process.

Bayesian optimization is a very powerful method to find the extrema (maxima, minima) of objective functions. Bayesian optimization approaches have proven to be particularly useful when the function evaluations are expensive, one has no access to derivatives, the problem is not convex, or the available function evaluations are very noisy. Bayesian optimization techniques are among the most efficient approaches in terms of the number of function evaluations required. A large part of the efficiency results from the ability of Bayesian optimization to take into account a-priori assumptions and knowledge about the problem and to update this knowledge through targeted function evaluations. In doing so, a trade-off is always made between exploring the search space and exploiting the current state of knowledge.

Bayesian optimization is a type of black-box global optimization where the function $f(x)$ to be optimized is not known and is modeled as Gaussian process. It aims at minimizing the number of function evaluations by replacing the function to be optimized with a surrogate function. The latter is obtained by sampling the objective function and interpolating the samples with a map that, compared to the original function, is very cheap to evaluate. The surrogate is then used to solve a (much cheaper) global optimization problem that decides the new point where the original function must be evaluated. To take into account the fact that the surrogate and the true objective function differ from each other in an unknown way, the surrogate is typically augmented by an extra term (probability confidence intervals) that takes into account such an uncertainty. The resulting acquisition function is therefore minimized instead for generating a new sample of the optimization vector, trading off between seeking for a new vector where the surrogate is small and looking for regions of the feasible space that have not yet been visited.

In contrast to other optimization methods, Bayesian optimization creates a probabilistic model for the objective function and then updates and improves this model in an iterative process by adding further data points. The basic idea here is that the entire information of all calculated data points can be used and not only the local gradient of the last specific data point. The Bayes theorem is used to generate and update this probabilistic model.

Another crucial aspect of Bayesian optimization is the use of a so-called acquisition function to determine the next data point to be used, given a conditional distribution over the values of f(x) to be optimized. This acquisition function, which can be defined in various ways, describes a form of usefulness of the data points for the model. By determining the maximum of this function, the next data point to be used is selected, which allows to achieve a small number of required data points with good results.

A Gaussian process, GP, is a stochastic process in which each finite subset of random variables is multidimensionally normally distributed. A GP may be used as prior for the BO. The GP encodes the assumptions about the function $f(x)$ to be optimized.

It is to be noted that a Gaussian process, in contrast to multidimensional normal distributions, is not a distribution of random variables but a distribution of functions. A Gaussian process can be used as a-priori probability of the probabilistic model of Bayesian optimization. Using data points for which the function values are known, it is then possible to calculate the posterior probability of the model and thus update the model.

In the laser cutting application, several objectives (optimization criteria) are considered, such as feed-rate, straight cutting quality or other types of quality assessment, corner quality, etc. For each of these objectives, a Gaussian Process describing the relation between the machine parameters and the objective is constructed. Thus, a multi-objective function $f(x)$ is generated and optimized by weighting the different objectives according to the user's desiderata, in order to assign priorities to the optimization process. Having a multi-criteria optimization, the optimization results in a trade-off between all the specified objectives. In a preferred embodiment, an objective function is optimized for each process parameter differently in a separate process.

Generally, the invention differs significantly from a pure rule-based approach in that a statistical model is generated based upon an evaluation of executed test cuts, wherein the number of test cuts is to be reduced. The dynamically generated statistical model is updated and improved in an iterative process in the calibration phase.

For further details relating to BO, using GP as prior, it is referred to Brochu, Eric, Vlad M. Cora, and Nando De Freitas [in particular Sections 2.1, 2.2, 2.3]. "A tutorial on Bayesian optimization of expensive cost functions, with application to active user modeling and hierarchical reinforcement learning." arXiv preprint arXiv:1012.2599 (2010).

In another preferred embodiment, the preference-based algorithm is based on a pairwise comparison algorithm by comparing each test processing result with the best achieved one. A surrogate function is fit in order to satisfy the preferences expressed by the user. Thus, evaluating the surrogate for different input parameters and comparing the obtained values, it is possible to describe the user's preferences. An acquisition function balancing exploitation and exploration is created based on the fitted surrogate function, and used to propose a new or a batch of experiments. Such a procedure is iterated until a maximum number of experiments is performed or a satisfactory result is achieved. "Exploration" in this context refers to searching in regions with high uncertainty and "exploitation" refers to searching in regions with high estimated value. In addition, the acceptability on the specified quality metrics can be considered during the optimization. For more details relating to the pairwise comparison algorithm it is referred to González, J., Dai, Z., Damianou, A., & Lawrence, N. D. *Preferential bayesian optimization*. arXiv preprint arXiv:1704.03651 (2017); Alberto Bemporad, and Dario Piga. "*Global optimization based on active preference learning with radial basis functions.*" *Machine Learning*, 110, (2021).

The technical advantage is that the evaluation process is faster, cheaper and more reliable. Furthermore, it doesn't need any external measurement, and it is based only on the preference made by the operator. This is based on experiments, in which it was shown that humans are better at expressing a preference rather than ranking a large set of options. Furthermore, in another preferred embodiment, where the comparisons are based on an overall assessment (e.g., global cutting quality of the processed workpieces), the user is not required to weight the different objectives.

In addition to what is described in the paper ("Global optimization based on active preference learning with radial basis functions"), the objective function in the present invention for a laser cutting application has been extended in order to contain both, first preferences (in particular, one-by-one comparison-based preferences, like "i-th piece better then j-th piece") given by an operator input signal on a user interface, and second (even quantitative) objectives (e.g., penalties on loss of cut, penalties on unacceptable piece, etc.).

As an advantage, the method and/or the re-optimization algorithm described herein, provide(s) the possibility to process heterogenous input as evaluation of the test processes, provided by the option of applying two different algorithms, the preference-based and the measurement-based algorithm. In particular, the method may process both preference-based (user) feedback and measurement-based signal feedback by applying the two algorithms.

A major technical effect and advantage of the proposed method is that the processing time for calculating the material property specific (and machine specific) process parameters may be reduced significantly, due to the use of an optimization tool based on a statistical model using GP priors for BO of the laser cutting parameters.

According to another preferred embodiment, the specific material properties at least comprise a material type dataset and/or a thickness dataset. The material dataset is an electronic dataset with digital data. The material dataset may characterize the type of material to be processed, e.g. the metal sheet being steel or aluminum. The material dataset may e.g. represent the composition of the alloy. The thickness dataset is an electronic dataset with digital data. The thickness dataset may characterize the thickness of the material to be processed or cut. In this respect it is to be noted, that different types of materials in different thicknesses require different process parameters.

According to another preferred embodiment, evaluating the test processes is based on generating a standardized quality metric comprising a set of quality indices, which preferably consists of burr height in dependence of feed rate and/or robustness of the laser process. Other quality measures may be defined by accessing a set of preconfigured selection of quality measures.

In another preferred embodiment, evaluating the test processes may be performed by means of applying an automatic quality assessment algorithm, in particular based on optical sensor data which are acquired offline after execution of the test processes. The optical sensor data stem from optical sensors, like a set of cameras and/or diodes.

In another preferred embodiment, determining the preconfigured initial process parameters is performed by selecting from a set of process parameters those, which are determined to be optimal for the same or for similar material properties as the determined material properties. This has the technical advantage that the search domain to be applied in the re-optimization algorithm for finding the optimized material-specific process parameters may be reduced and shaped to the specific optimization problem to be solved. This at the end reduces the computation time significantly.

In another preferred embodiment, for re-defining the parameter domain a physical model is used in order to shape the parameter domain for optimization initialization as described above.

In another preferred embodiment, for evaluating the test processes a standardized quality metric is determined specifically for different types of sensor data, in particular one for optical sensor data by means of using a set of optical sensors and/or diodes. Other standardized quality measures may be provided for other types of sensor data (like contour deviations, acoustic sensor data, temperature sensor data etc.).

The optical sensors may comprise at least one camera. The camera may be positioned in the laser head, in particular coaxially to the laser stream as in-process camera. The camera may further be provided as external camera, e.g. provided in a mobile device (smart phone etc.). Computer vison algorithms may be applied for processing and pre-processing of the acquired images, in particular in case of cutting: of the cutting edge for quality determination. The diodes may be a set of diodes, which may be arranged coaxially or off-axially to the laser beam.

In another preferred embodiment, the re-optimization algorithm optimizes an objective function, which is customer specific and/or which may be user defined. The objective function may include a maximization of at least one quality index of test processes, in particular, test cuts, a maximization of a feed rate of a laser head, and/or a minimization of power consumption and gas consumption of a laser machine. As previously mentioned, surrogate models describing the relation between input parameters (like optimization criteria) and target outputs are used to maximize the objective functions, either through the measurement-based or the preference-based algorithm.

Generally, the proposed objective function contains all target specifications that the user would like to optimize (together and in combination). The optimization will be a trade-off between all the defined target specifications. As an example, the optimization variables can be a probability of avoiding loss of cut, a cut quality (e.g. to maximize the quality of the e.g. straight cut), surface quality (to maximize the lateral surface/cutting edge quality of the workpiece), etc.

Up to now, the invention has been described with respect to the claimed method. Features, advantages or alternative embodiments which have been described with respect to the method can also be assigned to the other claimed subject matters (e.g. the optimization tool or the computer program) and vice versa. In other words, the subject matter which is claimed or described with respect to the device can be improved with features described or claimed in the context of the method and vice versa. In this case, the functional features of the method are embodied by structural units of the system and vice versa, respectively. Generally, in computer science a software implementation and a corresponding hardware implementation are equivalent. Thus, for example, a method step for "storing" data may be performed with a storage unit and respective instructions to write data into the storage. For the sake of avoiding redundancy, although the device may also be used in the alternative embodiments described with reference to the method, these embodiments are not explicitly described again for the device.

According to another aspect the invention relates to an optimization tool, which is or may be implemented in a device for controlling the laser machine. The optimization tool may be implemented as optimizer in a controller. The optimization tool is configured to execute the method as described above. In particular the optimization tool serves for calculating optimized material-specific process parameters for a laser process to be executed on a laser machine. The optimization tool may comprise:

- A property interface for receiving determined material properties for which the process parameters should be optimized;
- A parameter interface for receiving preconfigured initial process parameters;
- A processor for executing a re-optimization algorithm until a target objective function is optimized (minimized or maximized) for calculating optimized material-specific and/or process-specific process parameters by accessing a storage with a statistical model, wherein the processor comprises:
- A controller for controlling execution of test processes with the determined preconfigured initial process parameters;
- An evaluation module for evaluating the test processes by using a measurement-based algorithm or a preference-based algorithm for determining preferences for the test processes;
- Wherein the processor is adapted to re-define a parameter domain for the re-optimization algorithm based on the determined preferences of the evaluation module. Preferably, the re-defining may be executed once at the start of the re-optimization algorithm.
- A computer program comprising a computer program code, the computer program code when executed by a processor causing the optimization tool to perform the steps of the method of any of the method claims.

In another aspect the invention relates to a computer-readable medium, on which program code sections of the computer program are stored or saved, said program code sections being loadable into and/or executable in a computer node to make the computer node execute method for calculating optimized material-specific process parameters for a laser process to be executed on a laser machine. The computer node may be implemented in the laser machine or may be in data connection with the same and may be implemented on a (e.g. central) server in a networked system (e.g. cloud based).

The realization of the invention by a computer program product and/or a computer-readable medium has the advantage that already existing computing infrastructure can be easily adopted by software updates in order to work as proposed by the invention.

BRIEF DESCRIPTION OF THE SEVERAL VIEWS OF THE DRAWINGS

Further advantages features and details of the various embodiments of this disclosure will become apparent from the ensuing description of a preferred exemplary embodiment or embodiments and further with the aid of the drawings. The features and combinations of features recited below in the description, as well as the features and feature combination shown after that in the drawing description or in the drawings alone, may be used not only in the particular combination recited but also in other combinations on their own without departing from the scope of the disclosure.

The following is an advantageous embodiment of the invention with reference to the accompanying figures, wherein.

DETAILED DESCRIPTION OF THE INVENTION

Figure 1:
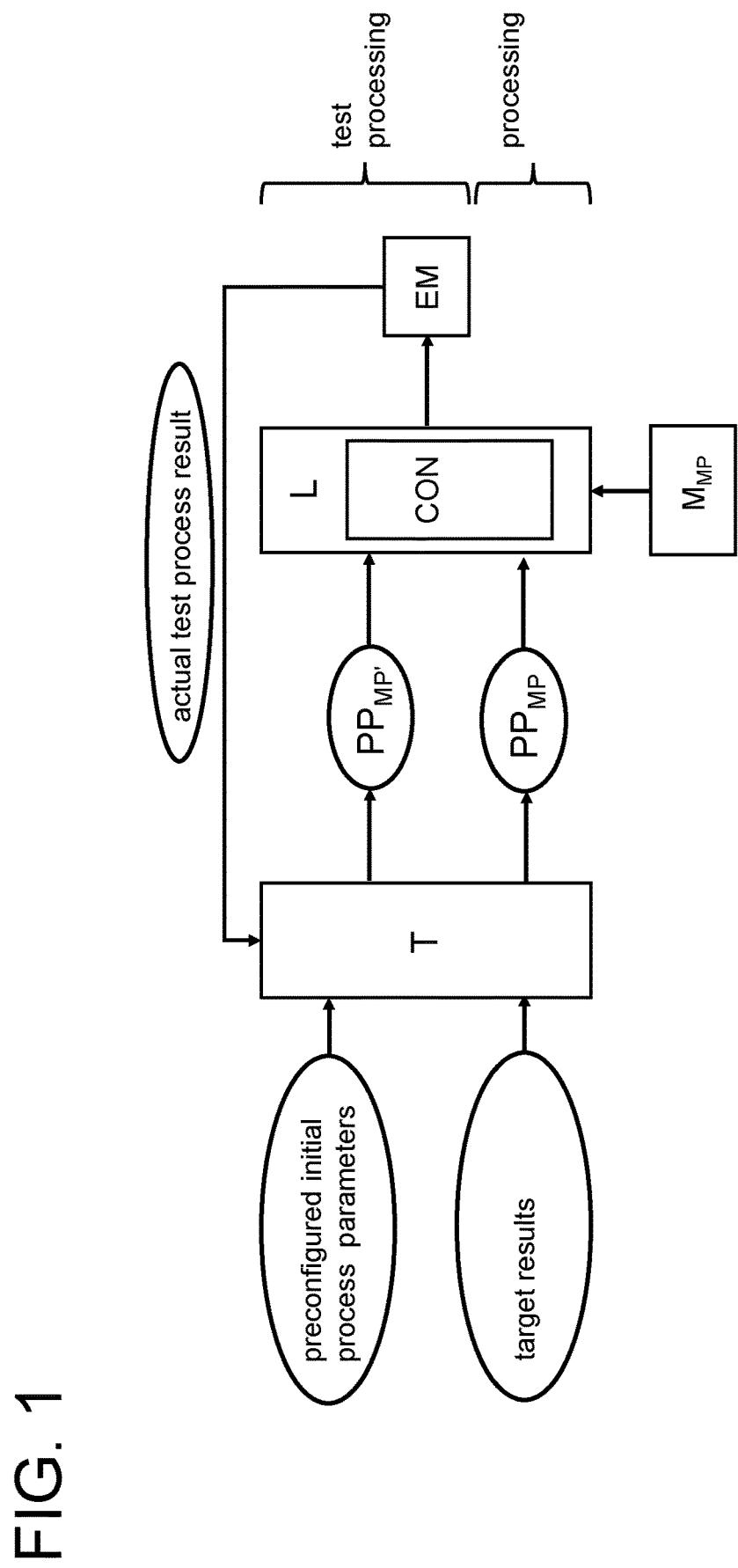
FIG. 1 shows a processing pipeline with an optimization tool for calculating optimized material-specific process parameters according to a preferred embodiment of the present invention.

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including not only one of A, only one of B, only one of C, or any combination of A, B, and C.

Generally, the present invention relates to providing optimized process, in particular cutting parameters, which are optimized for a specific material property and for a specific laser machine environment, i.e. a laser cutting machine, having specific machine properties.

One major aspect of the present invention relates to applying a measurement-based Bayesian optimization, BO. The proposed objective function contains all the target specifications that the user would like to optimize—together and in combination—thus, the optimization will be a trade-off between all the defined specifications. Thus, the problem is formulated as a multi-criteria optimization problem, namely: a single objective function by all the different criteria. As an example, the optimized output can aim at avoiding loss of cut, straight quality (to maximize the quality of the straight cut), surface quality (to maximize the lateral or edge surface quality of the cut workpiece), etc. Each output (optimization objective, i.e., selected output of the cutting process) is independently modeled as a GP. The GPs are used in order to provide predictions to model the acquisition function for guiding the BO. m initial points (i.e., sets of process parameters—the process parameters to perform the cut—, with—commonly—m=1000) are randomly initialized, and then used to predict the corresponding values of the acquisition function. Then best initial points (commonly n=5) are then used to perform the nonlinear optimization of the modeled acquisition function, giving back the optimized set of process parameters to be used in the next experiment. To speed up the offline optimization process, the user may be asked to directly perform experiments with these n=5 parameters, while waiting for the solution of the nonlinear optimization problem.

Preferably, the measurements for the optimization variables (i.e., to define a way to measure the cutting qualities, such as straight cutting quality) are standardized, because all the measures given to the algorithm should be reliable to define a reliable model to be used by the BO. In addition, the definition of the range in which to perform the optimization (i.e., the machine parameters domain to be considered by the BO) is important. This should be big enough to contain the optimum set of machine parameters, but not too big to avoid a high number of experiments required by the BO for convergence. A parameter that can be also defined by an expert user (or given by default) is the one guiding tradeoff between exploration and exploitation of the BO.

Another aspect relates to a preference-based optimization. The preference-based algorithm aims at actively learning a surrogate of the latent (unknown or perhaps unquantifiable) objective function from past sampled decision vectors and pairwise preferences. The surrogate is required to satisfy the preferences expressed by the decision maker on existing samples. The surrogate is used to propose a new sample of the decision vector for comparison with the current best candidate based on the maximization of an acquisition function which also promotes exploration of the input space.

Preferably, the definition of the domain of the process parameters and the parameter guiding exploration/exploitation are important inputs. In this case, there are no measurements to be provided to the algorithm, but only preferences provided as signals from a user interface and expressed by the user.

The determination of the material properties can be achieved with different means. In a simple embodiment, the material is only roughly specified, e.g. mild steel, stainless steel, aluminum etc. As long as an optimization process is carried out from scratch, the material only plays a role in the selection of the intervals for the variation of the input variables. In a more advanced embodiment, means are provided which allow to know the material properties and related material parameters more precisely. There are basically two possibilities. Either a digital form of a material certificate of a material manufacturer is requested, e.g. in the form of a scannable or detectable code (e.g., 2D barcode) or the alloy components are measured using e.g. an Optical Emission Spectrometer.

The preference-based algorithm is based on a comparisons among two or more workpieces. Considering the pairwise comparison algorithm (i.e., the preference-based algorithm), implementation details are given above and in Alberto Bemporad, and Dario Piga. "*Global optimization based on active preference learning with radial basis functions.*" *Machine Learning,* 110, (2021). The main advantage given by the method is related to the fact that no quantitative measurements are needed and thus the user is not required to quantitatively assess "the goodness of the cut". The quality assessment can be performed by the operator visually inspecting the parts or measuring quantitative indexes, but finally only a user's preference is given to the algorithm. In such a way, the generated modeling is more reliable, considering that the judgement process is well-performed. In fact, it is well known in general that for humans it's much better to express a preference between two options (such as A is better than B) rather than giving a quantitative score to an option. Without making any quantitative measurement, three main advantages are achieved: avoiding to standardize the measurement process (i.e., having a more reliable judgement process), avoiding the need of a sophisticated measurement system, thus being faster and cheaper in the comparison of the parts (that is the most time-expensive process during the optimization procedure).

Preferably, a 2-step approach is applied:
1. Initializing the optimization
2. Refinement of the parameters.

Step 1: a global optimization can be performed starting from scratch and based on the algorithms described above. This is required if no previously-computed optimized parameters are available (e.g., a new material or a new thickness has to be processed). In such a case, a "big" domain for the machine parameters can be defined, giving the possibility to the algorithm to explore it to compute the optimized set of machine parameters.

Step 2: if an optimized set of machine parameters is already available for a material/thickness similar (but not exactly the same) to the one to be cut, a refinement optimization can be performed (e.g., a customer having two plates with same thickness but with slightly different material properties—such as differences in the material alloy composition). The algorithms are the same for the global optimization (as described above). The main difference is in the definition of the domain of the process or in particular machine parameters. The domain can be restricted in a limited range starting from the previously computed optimized set of machine parameters in order to have a faster optimization procedure (a percentage variation—e.g., 5%—of the optimum machine parameters can be imposed to compute the parameters domain for the optimization). The same approach can be applied in the case that the same plate has to be cut on a different machine that can show a slightly different optimum.

Therefore, Step 1 and Step 2 are linked by the fact that an optimization set of machine parameters is already available for a similar workpiece plate. If yes, optimized machine parameters from Step 1 can be used to initialize the domain for the optimization in Step 2.

The above described measurements-based methodology provides advantages in terms of standardization of the procedure for optimization and in terms of multi-criteria optimization. The above described preference-based methodology provides advantages in terms of judgement (reducing time and cost for the experiments) and possibility to handle heterogeneous information, while having the possibility to include both preferences and quantitative measurements.

In the following pseudo code is provided for describing the algorithms in more detail by way of example. The first two pseudo-codes are related to the measurement-based optimization algorithm, which rely on Gaussian Process modelling and Bayesian Optimization, while the third and the fourth pseudo-code are related to the preference-based optimization. The second and the fourth pseudo-code address the problem of re-optimization of the input parameters for new (but similar) machine settings and workpiece properties.

1. Pseudo-code for BO for laser application:
1. User defines his/her own quality metrics for optimization (e.g., loss of cut, straight cut quality, corner quality, performance, energy consumption etc.) as optimization criteria or parameter (which later serve as input parameters for the re-optimization algorithm;
2. the operator defines the optimization parameters (e.g., nozzle size, focal position, etc.);
3. for each optimization parameter, the operator defines a range of variation in which the cut has to be robust (i.e., acceptable cutting performance with respect to parameters variation);
4. Generate N random initial samples X={x1, . . . , xN};
5. for each sample, the quality metrics are measured and results are given to the BO algorithm;
6. For n=1:nmax (maximum number of optimization iteration) do
   a. for each quality metric: train a surrogate model (specifically, a Gaussian Process) describing the relation between input parameters and target output;
   b. define the acquisition function (such as the Expected Improvement described in Brochu, Eric, Vlad M. Cora, and Nando De Freitas. [Section 2.3] "*A tutorial on Bayesian optimization of expensive cost functions, with application to active user modeling and hierarchical reinforcement learning.*" arXiv preprint arXiv: 1012.2599 (2010)), taking into account the surrogate function, penalties (due to high probability of loss of cut and thresholds on target qualities with specified weights), robustness (worst case scenario within the input range defined in 3), and exploration of the parameter domain;
   c. optimize the acquisition function to compute the new batch of cut parameters for experiments;
   d. perform the experiments;
   e. for each new sample in the proposed batch, the quality metrics are measured and results are given to the BO algorithm.

2. Pseudo-code for re-optimization for laser application with the use of pre-defined optimal initial process parameters, which have been determined to be optimal for similar workpiece properties and/or similar settings:
1. User defines his/her own quality metrics for re-optimization (e.g., loss of cut, straight cut quality, corner quality);
2. the operator defines the re-optimization parameters (e.g., nozzle size, focal position, etc.);
3. for each re-optimization parameter, the operator defines a range of variation in which the cut has to be robust (i.e., acceptable cutting performance with respect to. parameters variation);
4. on the basis of previously optimized similar process/settings, the re-optimization domain is defined around the previous optimal point(s). Box(es) centered at the selected point(s) is expanded until acceptable cutting performance is guaranteed for all the points in the box. This allows to restrict the optimization parameters domain for the re-optimization;
5. Generate N random initial samples X={x1, . . . , xN};
6. for each sample, the quality metrics are measured and results are given to the BO algorithm;
7. For n=1:nmax (maximum number of optimization iteration) do
   a. for each quality metric: train GPs to predict the target quantities;
   b. compute the surrogate function, according to Brochu, see above;
   c. define the acquisition function taking into account the surrogate function, penalties (due to high probability of loss of cut and thresholds on target qualities with specified weights), robustness (worst case scenario within the input range defined in 3), and exploration of the parameter domain;
   d. optimize the acquisition function to compute the new batch of cut parameters for experiments;
   e. perform the experiments;
   f. for each new sample in the proposed batch, the quality metrics are measured and results are given to the BO algorithm.

3. Pseudo-code for preference-based optimization for laser application:
1. User defines his/her own quality metrics for optimization (e.g., loss of cut, straight cut quality, corner quality);
2. the operator defines the optimization parameters (e.g., nozzle size, focal position, etc.);
3. for each optimization parameter, the operator defines a range of variation in which the cut has to be robust (i.e., acceptable cutting performance with respect to parameters variation);
4. Generate N random initial samples X={x1, . . . , xN};
5. for each sample, the acceptability (yes/no) of the quality metrics is stated by the operator;
6. the operator perform pairwise comparisons between the samples and for each pair the operator expresses his/her preference. Among the N samples, the best one is selected;
7. For n=1:nmax (maximum number of optimization iteration) do
   a. for each quality metric train a classifier providing the probability of acceptable cutting performance;
   b. compute the surrogate function defining the observed preferences through GP as in Brochu, Eric, Vlad M. Cora, and Nando De Freitas [Section 3]. "A tutorial on Bayesian optimization of expensive cost functions, with application to active user modeling and hierarchical reinforcement learning." arXiv preprint arXiv:

1012.2599 (2010) or through constraints learning as in Gonzalez, J., Dai, Z., Damianou, A., & Lawrence, N. D. Preferential bayesian optimization. arXiv preprint arXiv:1704.03651 (2017); Alberto Bemporad, and Dario Piga. "Global optimization based on active preference learning with radial basis functions." Machine Learning, 110, (2021). Constraints are enforced in creating the surrogate functions in order to guarantee that the trained surrogate satisfy the preferences expressed by the user;
c. define the acquisition function taking into account the surrogate function, penalties (due to high probability of unacceptable cut for each quality metric with specified weights), robustness (worst case scenario within the input range defined in 3), and exploration of the parameter domain;
d. optimize the acquisition function to compute the new batch of cut parameters for experiments;
e. perform the experiments;
f. for each new sample in the proposed batch, the acceptability (yes/no) of the quality metrics is stated by the operator;
g. the operator performs pairwise comparisons within the new batch and for each pair the operator expresses his/her preference. Among the new batch, the best one is selected and compared with the best sample achieved so far.

4. Pseudo-code for preference-based re-optimization for laser application:
1. User defines his/her own quality metrics for re-optimization (e.g., loss of cut, straight cut quality, corner quality);
2. the operator defines the re-optimization parameters (e.g., nozzle size, focal position, etc.);
3. for each re-optimization parameter, the operator defines a range of variation in which the cut has to be robust (i.e., acceptable cutting performance with respect to parameters variation);
4. on the basis of previously optimized similar process/settings, the re-optimization domain is defined around the previous optimal point(s). Box(es) centered at the selected point(s) is expanded until acceptable cutting performance is guaranteed for all the points in the box. This allows to restrict the optimization parameters domain for the re-optimization;
5. Generate N random initial samples X={x1, . . . , xN};
6. for each sample, the acceptability (yes/no) of the quality metrics is stated by the operator
7. the operator performs pairwise comparisons between the samples and for each pair the operator expresses his/her preference. Among the N samples, the best one is selected.
8. For n=1:nmax (maximum number of optimization iteration) do
   a. for each quality metric train a classifier providing the probability of acceptable cutting performance;
   b. compute the surrogate function defining the observed preferences (see above);
   c. define the acquisition function taking into account the surrogate function, penalties (due to high probability of unacceptable cut for each quality metric with specified weights), robustness (worst case scenario within the input range defined in 3), and exploration of the parameters domain;
   d. optimize the acquisition function to compute the new batch of cut parameters for experiments;
   e. perform the experiments;
   f. for each new sample in the proposed batch, the acceptability (yes/no) of the quality metrics is stated by the operator;
   g. the operator performs pairwise comparisons within the new batch and for each pair the operator expresses his/her preference. Among the new batch, the best one is selected and compared with the best sample achieved so far.

In the foregoing explanation of the four pseudo code examples, the terms "optimization parameters" or "re-optimization parameters" are to be understood as input parameters for the re-optimization algorithm which are to be re-fined or re-optimized. The input parameters are received on a HMI.

In the following the invention is described with respect to FIG. 1 in the exemplary embodiment related to laser cutting. However, it is worth remarking that the invention may also be used for other processes than cutting, like for example engraving.

The optimization method makes use of an optimization tool, which may be implemented as electronic module T. The optimization tool T may be implemented in a laser machine L, which is to be used for laser cutting, or may be provided as external electronic instance, being in data connection via respective networks (LAN, WAN, bus et cetera). The optimization tool T is provided with respective input interfaces in order to receive pre-configured initial process parameters and a target result. The target result may for example relate to a cutting quality of the cut part and/or to performance of laser cutting and/or to other result evaluation criteria. The result evaluation criteria may be preconfigured in an upstream configuration phase.

Generally, in laser cutting, it is to be noted that the process parameters are dependent of the type of material to be processed. For example, a first set of process parameters has to be applied for first type of material, e.g. a 3 mm steel plate in a certain alloy, whereas a second set of process parameters has to be applied for a second type of material, e.g. 8 mm steel plate in another alloy. Further, the process parameters, like the focal position, feed rate, laser power, gas pressure, nozzle clearance height show high interdependencies, meaning that a first parameter may have an effect on a second parameter as well. This makes calculating of optimized process parameters a complex task.

Usually, the result of laser cutting, in particular the quality of the cut, should be optimized. However, in other scenarios, focus may be directed on robustness of the process or on performance, so that the quality plays a minor role. All these aspects have to be considered, when calculating a set of optimized process parameters.

As can be seen in FIG. 1, the optimization tool T may use the received preconfigured initial processing parameters as a starting point for the optimization procedure. Preferably, the preconfigured initial processing parameters may have been determined to be optimized for similar or even for the same material properties compared to the material properties of the workpiece to be cut. Further, the preconfigured initial processing parameters may have been determined to be optimized for a similar or even for the same machine setting a of a laser machine L. The term "machine setting" has to be construed in the sense of a process environment, like a certain type of laser machine L, e.g. with certain physical and/or mechanical components, like laser head.

In a first embodiment, the received preconfigured initial processing parameters may be used identically as preliminary process parameters, for initializing the re-optimization procedure. In a second embodiment, the received preconfigured initial processing parameters may be processed by applying an initialization function to calculate the preliminary process parameters, for initializing the re-optimization procedure. For example, the initialization function may calculate a mean value of the received parameters. Alternatively, or cumulatively other environmental data relating to the processing environment (type of laser machine, temperature, etc.) may be processed by the initialization function.

Thus, usually the received preconfigured initial processing parameters are not optimized for the specific type of material to be cut. In this case, the optimization method according to this invention is to be applied. Thus, the preconfigured initial processing parameters need to be transformed—in the mathematical sense—by using a function $f$ into optimized material-specific process parameters. However, this function $f$ is not known or is costly to compute. Therefore, the invention suggests to execute so-called "experiments", i.e. test cuts (test processes) with a set of preliminary process parameters, which are not yet optimized for the material properties to be cut. These preliminary process parameters may be optimized for workpieces with similar material properties than the material properties of the workpiece to be cut. These preliminary process parameters are referenced in FIG. 1 with the numeral $PP_{MP'}$. The apostrophe "'" stands for "similar (material property)—and therefore preliminary (process parameter)". Thus, the preliminary process parameters $PP_{MP'}$ which are not yet adapted the actual material properties and machine environment at hand are fed to the controller CON of the laser machine L for execution, e.g. for controlling the cutting head attached to a linear drive as one of the actors (not shown). With other words, test cuts are executed with the preliminary process parameters. After each or a set of test cuts an evaluation module EM is configured for evaluating the result of the test cut, in particular the quality. For evaluation of the quality of the test cuts, two different approaches (measurement based and preference-based algorithms) may be used, which will be explained later on. The actual result, which may be expressed in terms of multiple-star rating, in particular five-star rating, of the quality evaluation of the test cuts is fed back to the optimization tool T. This process may be re-iterated until the target quality is reached. Then, the optimized material specific process parameters, which are referenced in FIG. 1 with the numeral $PP_{MP}$ are calculated, which are optimized for the specific type of material and/or with respect to the specific thickness of the material to be cut which is shown in FIG. 1 with the numeral $M_{MP}$, which refers to the workpiece, e.g. sheet metal with certain material properties MP (certain material type and/or certain thickness). After this preparation phase, which only takes up to 10 to 20 test cuts, the optimized material specific process parameters may be applied for cutting the laser plan.

Figure 2:
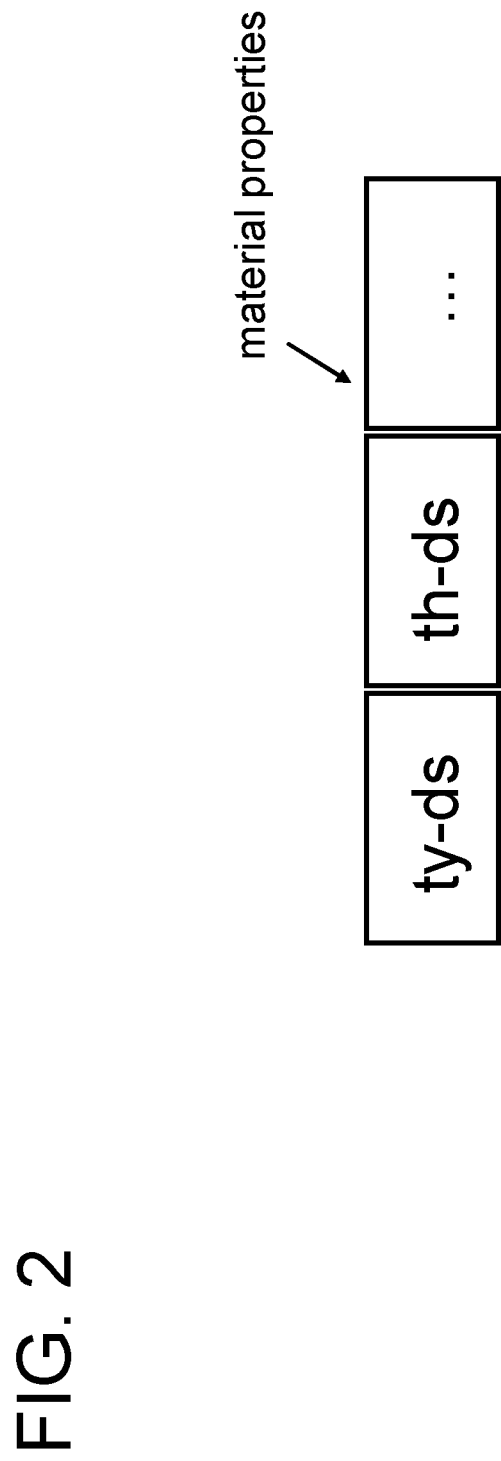
FIG. 2 shows a schematic block diagram of elements of the material property dataset according to a preferred embodiment of the present invention.

As already mentioned above, the material properties may relate at least to 2 different properties, like the type of material to be cut and the thickness of the material. Accordingly, two different datasets are processed, which is shown in FIG. 2:
1. a material type dataset ty-ds and
2. a thickness dataset th-ds.

In another more complex embodiment of the present invention and as mentioned above, apart from the above-mentioned material properties, also other properties, in particular properties relating to the process environment, like configuration or setting of the laser machine L are processed as additional datasets for calculating the optimized material specific and laser machine configuration specific process parameters.

Figure 3:
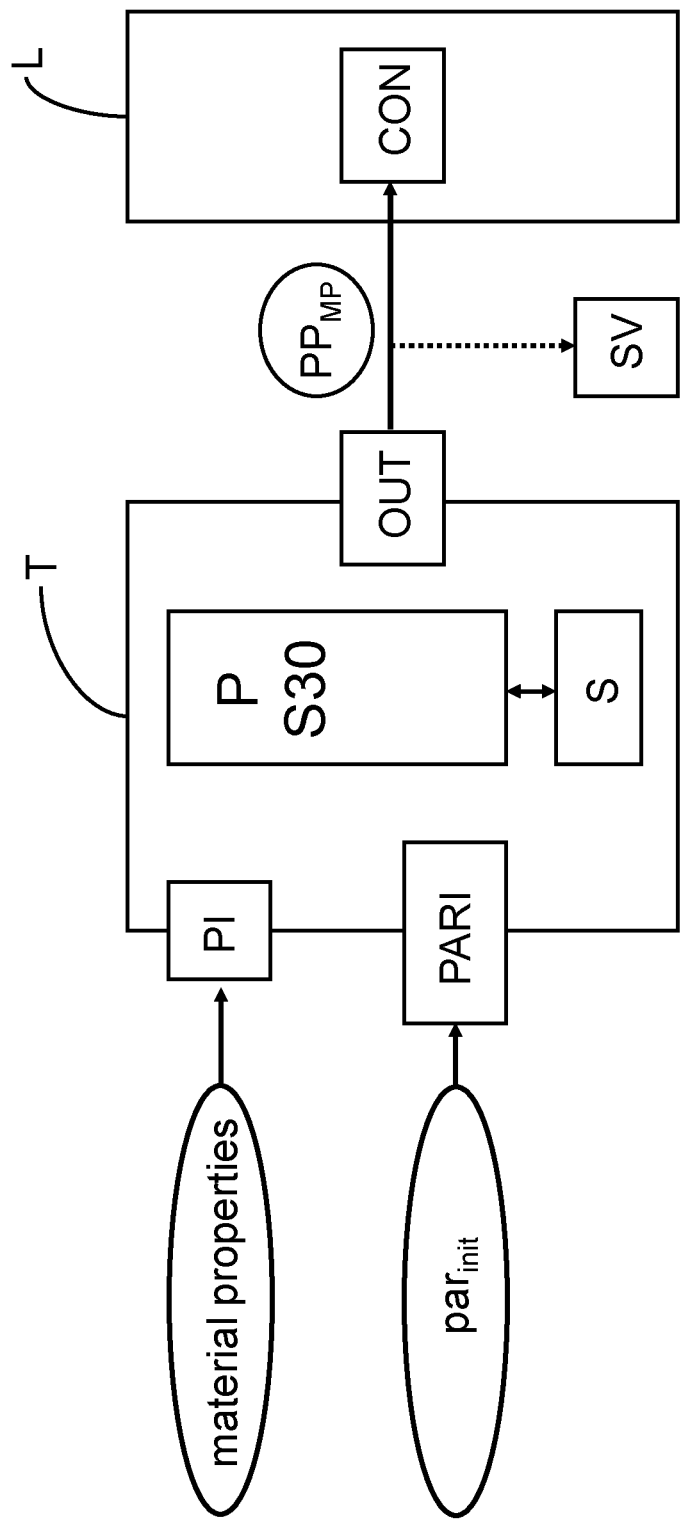
FIG. 3 is a schematic block diagram of electronic modules of an optimization tool controlling a laser machine according to a preferred embodiment of the present invention.

FIG. 3 shows the interfaces and modules of the optimization tool T according to a preferred embodiment of the present invention in more detail. The optimization tool T comprises the property interface PI which is adapted for receiving material properties, like a particular alloy and/or temperature of the workpiece to be processed. Several options may be implemented for receiving the material properties. In a first option, the material properties are received by user input via a user interface (Human Machine Interface, HMI). In a second option, the material properties are received from an external electronic instance, which could be—or be in data exchange with—and output interface of a manufacturer of the specific workpiece. In a third option, the material properties are received from laser machine internal sensors, which are adapted to detect the material properties automatically, for example by using a set of sensors, like a camera and/or diodes. Alternatively, or in addition, other external sensors may be used, like an external optical emission spectrometer or a handheld XRF analyzer (XRF: X-Ray Fluorescence).

In addition, the optimization tool T further comprises a parameter interface PARI which is adapted for receiving the preconfigured initial process parameters $par_{init}$, which—as explained above—may be optimized for similar material properties than the very material properties of the material to be actually cut.

The optimization tool T comprises a processor P which is configured to execute a re-optimization algorithm. For this purpose, the processor P is in data exchange with a storage S in which a statistical model in particular a Bayesian optimization model is stored. After having executed the optimization procedure the processor P may provide calculated optimized material specific process parameters $PP_{MP}$ on an output interface OUT. Preferably the set of calculated optimized material specific and/or configuration (alias process/setting) specific process parameters $PP_{MP}$ are directly forwarded to the controller CON of the laser machine L in order to control the cutting process. As shown in FIG. 3 with dashed lines, this result (optimized process parameters) may also be provided to a central server SV. The central server SV may be configured to be responsible for a fleet of different laser machines L. For this purpose, the central server SV may aggregate different datasets of optimized material specific and/or configuration specific processing parameters for different laser machines L. This has the technical advantage that the statistical model and/or other neural network models may be stored and provided centrally so that in the inference phase the inferred information may be rolled out to the different laser machines L. In this embodiment, shown in FIG. 3, the processor P is implemented directly on the optimization tool T, which in turn is provided as external instance to the laser machine L to which it is connected via network connection. Another configuration is shown in FIG. 4.

Figure 4:
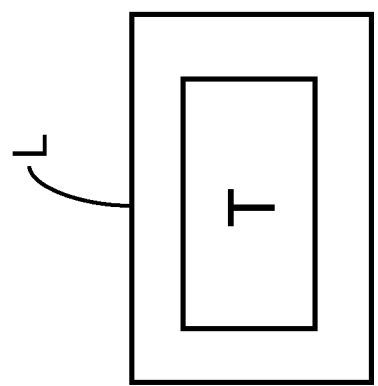
FIG. 4 is an alternative embodiment to the one shown in FIG. 3 for implementing the optimization tool within the laser machine.

FIG. 4 shows a laser machine L which comprises the optimization tool T. In this embodiment, the optimization tool T is directly implemented locally on the laser machine L. In this embodiment, all parameter optimization is machine specific as it is executed locally.

Figure 5:
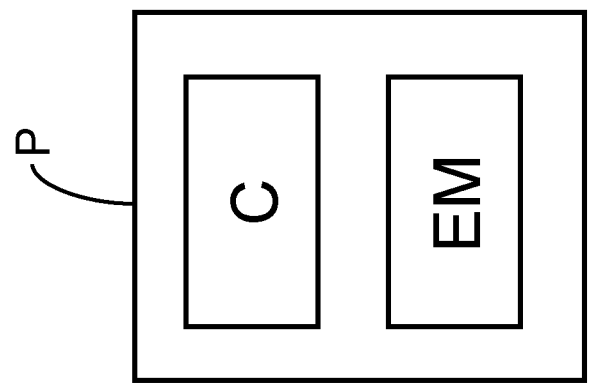
FIG. 5 shows a processor with electronic modules according to a preferred embodiment of the present invention in a schematic manner.

FIG. 5 schematically shows the processor P with its electronic modules according to the preferred embodiment of the present invention. As can be seen the processor P may comprise a second controller C and an evaluation module EM. The second controller C is configured to control the execution of the test cuts, as described above with the determined preconfigured initial process parameters in step S31. The evaluation module EM is configured to evaluate the test processes and thus the cutting quality of the cut parts by using the measurement-based algorithm or a preference-based algorithm for determining preferences for the test cuts in step S32. The processor P is configured to re-define the parameter domain and in particular to delimit the parameter domain for the re-optimization algorithm based on the determined preferences of the evaluation module EM in step S33. Preferably, this is done once, the evaluation by means of executing the set of test cuts is completed. It is not necessary, to adapt the parameter domain each time after one single test cut. In a preferred embodiment, the controller CON and the second controller C may be integrated to one single unit.

Figure 6:
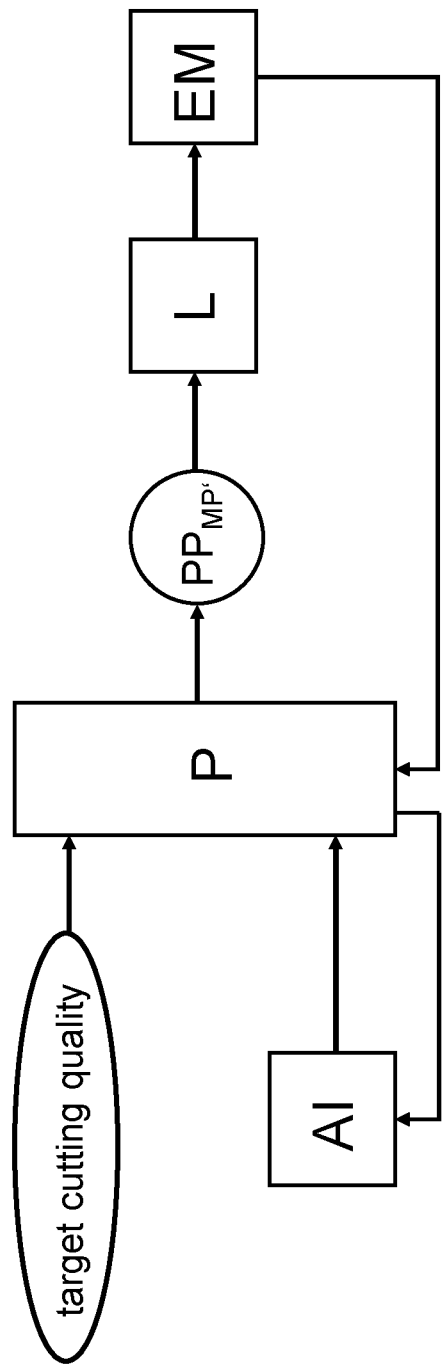
FIG. 6 shows a processing pipeline with an artificial intelligence module for generating the preconfigured initial process parameters.

FIG. 6 schematically shows another advantageous embodiment which makes use of an artificial intelligence module AI. The artificial intelligence module AI is configured for determining and providing the preconfigured initial process parameters. The processor P or another processing entity is in functional connection to the artificial intelligence module AI. The processor P is configured to receive a dataset, indicating a target cutting quality via a respective (e.g. user) interface. Based on the received target cutting quality the processor P and/or the artificial intelligence module AI may determine a first initial set of process parameters $PP_{MP}$, which are used for test cutting on the laser machine L. After the test cuts are finalized, the evaluation module EM, is activated to assess the quality of the test cuts. The result of the quality assessment may preferably be represented with a set or vector of numerical values. The quality assessment result is forwarded to the processor P for next step processing and for iteratively optimizing the preconfigured initial process parameters.

The evaluation module EM may be provided as external electronic module (as shown in the example of FIG. 6 and thus not being implemented on the laser machine L, but instead being provided as e.g. mobile device, in particular a communication device, like a smart phone, equipped with a camera to be used for acquiring an image of the cut part in order to assess its quality) or as electronic module, being implemented internally on the laser machine L. The evaluation module EM is used to assess the quality of the test cuts, e.g. by means of using optical sensors. A detected digital image may be processed automatically by first a preference-based algorithm or second by the measurement-based algorithm. The preference-based algorithm is configured not to use or require an absolute rating scale for the quality measure, but instead is configured to rely on a standardized quality scale. For this purpose, a pairwise comparison algorithm may preferably be used.

The evaluation module EM may comprise or may receive data from qualifying sensors, like an in-process camera, which may be implemented coaxially to the laser beam. In addition, or alternatively, the evaluation module EM may comprise or may receive data from quantifying sensors, like diodes, or other sensor types, which may be arranged either coaxially or off-axis to the laser beam.

An advantage is to be seen in the fact, that the objective function, which is optimized by the optimization tool T and which is used by the Bayesian optimization, can be a generic function, defined by the user and may for example aim at maximization of cutting quality, wherein for assessment of the cutting quality, a quality standard metric comprising a set of heterogeneous quality indexes, like corner quality, straight cut quality, lateral edge quality, perpendicularity of the cut edge, contour correctness et cetera is generated.

Figure 7:
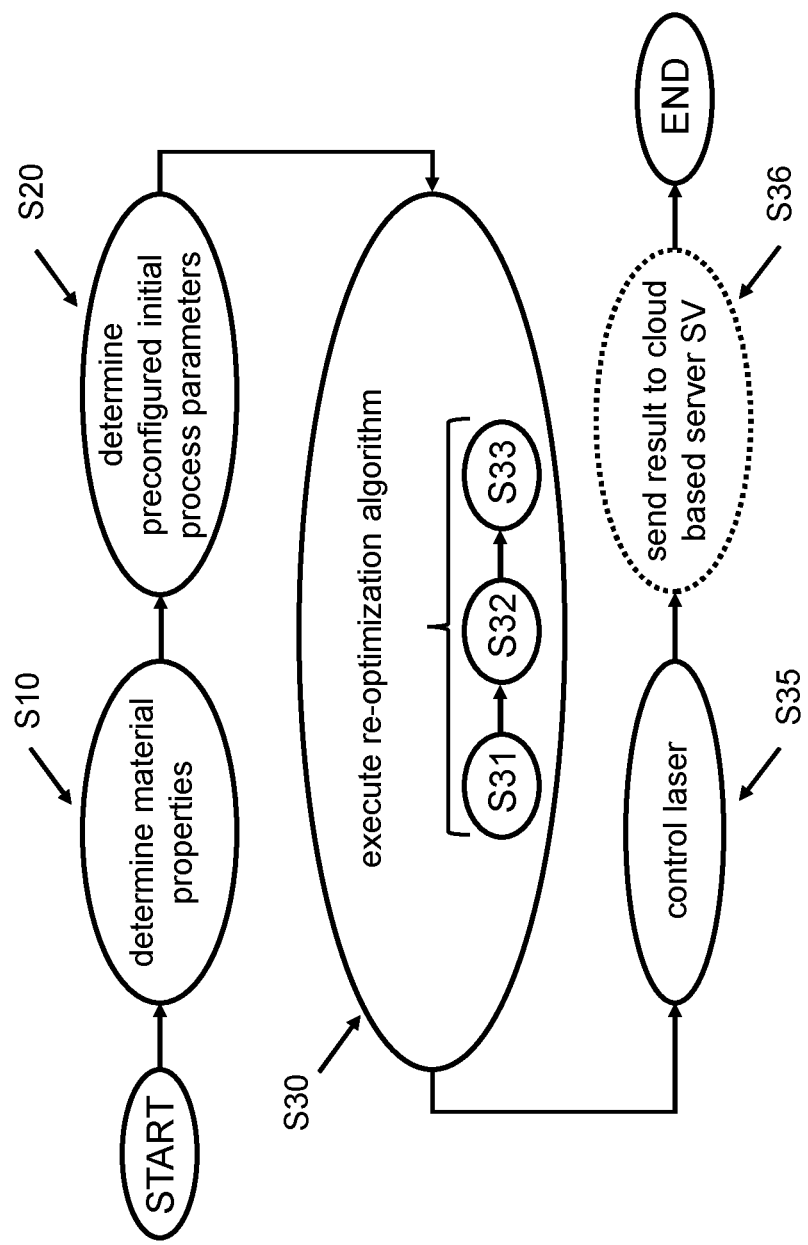
FIG. 7 is a flow chart of the method for calculating optimized material-specific process parameters for a laser process to be executed on a laser machine according to a preferred embodiment of the present invention.

FIG. 7 shows a flow chart of the optimization procedure according to a preferred embodiment of the present invention. After starting the optimization (START), the material properties are determined in step S10. This may be executed automatically or by user interaction, as already explained above. In step S20 preconfigured initial process parameters are determined. This may also be executed with a user interaction by means of using a user interface or by assessing a storage with stored historic data with previous process parameters. Moreover, the determination in step S20 may also be executed based on machine learning algorithms, as explained above with reference to FIG. 6. In this respect it is to be noted that the input variables do interact with each other. For example, the kerf width is influenced by the focal position. The focal position, in turn, determines the cutting kerf and therefore how much material will be molten. The maximum feed rate depends on the amount of material which has to be molten and the volume flow of the gas. The gas volume flow, again, is dependent on the nozzle size, the cutting kerf, the nozzle clearance height etc. The behavior of the material ejection by the gas depends on the material properties, the laser power, the gas volume flow etc. Therefore, optimization in view of these interdependent input variables and in view of the target cutting quality is a complex task.

In a preferred embodiment, step S10 is preceding step S20, because the preconfigured initial process parameters depend on the determined material properties. However, in alternative embodiments, for a person skilled in the art it is clear that the sequence of method steps may be changed.

Subsequently the re-optimization algorithm is executed in step S30. The execution of the re-optimization algorithm comprises—in step S31—controlling the execution of the test cuts on the laser machine L with the determined preconfigured initial process parameters and further comprises—in step S32—evaluating the test cuts by using a measurement-based algorithm or a preference-based algorithm for determining preferences for the test processes by means of the evaluation module EM. Moreover, the execution of the re-optimization algorithm may comprise—in step S33—to re-define the parameter domain for the re-optimization algorithm based on the determined preferences, determined by the evaluation module EM and thus on the results achieved so far. As such, the laser is controlled—in step S35—and results are sent to a cloud-based server SV—in step S36. In a first embodiment, the parameter domain may be defined before execution of the re-optimization algorithm. According to a second embodiment, the parameter domain may be re-defined depending on the results achieved during the continuous or iterative execution of the re-optimization algorithm. This step may be executed on the processor P. After this the method may be reiterated or may end, so that the optimized processing parameters are used by the laser machine L. Alternatively or cumulatively, the result with the calculated optimized material-specific process parameters may be sent to a central server SV for further processing for a farm of laser machines. Preferably, the optimization is stopped as soon as the target cutting quality (received as input) is achieved.

Figure 8:
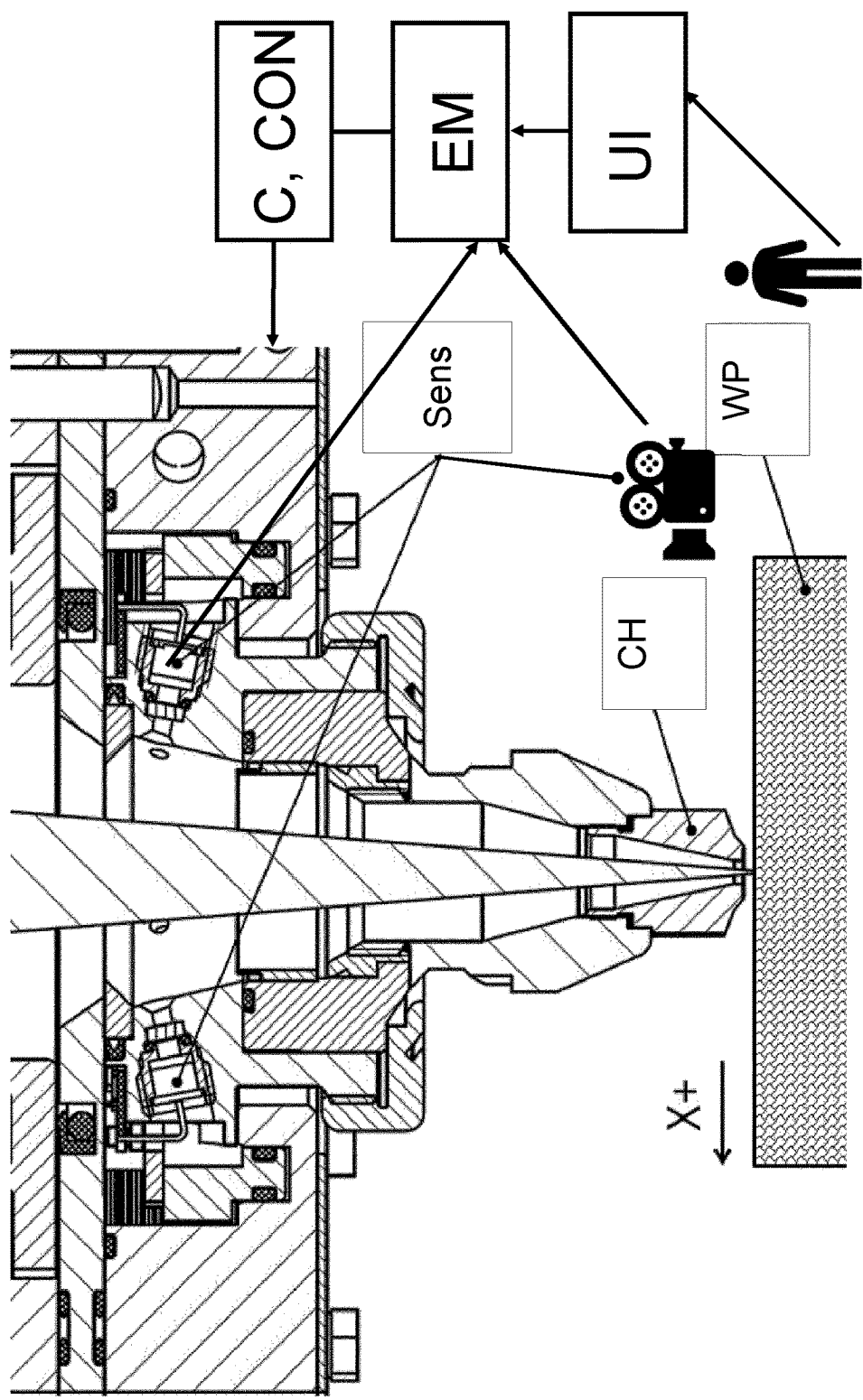
FIG. 8 is a schematic figure of parts of a laser machine with a workpiece to be processed which is controlled by a controller according to a preferred embodiment of the method of the present invention.

FIG. 8 shows a laser processing machine L with a laser cutting head CH to be moved over a workpiece WP to be cut, here in X+ direction. The laser system may comprise machine internal and/or external sensors Sens in order to monitor the processing (during processing) and the processing result (after processing). The sensor signals (shown in this example as optical sensors) send their measurement data to the evaluation module EM. The laser machine L is controlled by means of a controller C, CON. Preferably, the user may use a binary decision support algorithm with two respective user interface buttons for indicating "result OK" or "result failed". This binary decision support algorithm is run on the evaluation module and may be further processed.

In general, and in a preferred embodiment, the re-optimization procedure is based on a statistical model and not on a neutral network model. This has the advantage, that it is not required to train and test neural network model. Further, it is not required to execute a sufficiently large set of experiments to provide sufficient training data with labeled data. The optimization may be executed dynamically in real time as an upstream procedure before laser cutting according to the cutting plan starts. The optimization procedure minimizes the number of cutting experiments, which are needed for calculating the material and machine specific optimized processing parameters.

However, in another preferred embodiments of the invention, it is possible to use machine learning algorithms and a neural network structure, in particular for determining the preconfigured initial processing parameters.

A single unit or device may fulfil the functions of several items recited in the claims. The mere fact that certain measures or means are recited in mutually different dependent claims or embodiments does not indicate that a combination of these measures cannot be used to advantage.

Wherever not already described explicitly, individual embodiments, or their individual aspects and features, described in relation to the drawings can be combined or exchanged with one another without limiting or widening the scope of the described invention, whenever such a combination or exchange is meaningful and in the sense of this invention. Advantages which are described with respect to a particular embodiment of present invention or with respect to a particular figure are, wherever applicable, also advantages of other embodiments of the present invention.

Finally, it should be noted that the description of the invention and the exemplary embodiments are not to be understood as limiting in terms of a particular physical realisation of the invention. All of the features explained and shown in connection with individual embodiments of the invention can be provided in different combinations in the subject matter according to the invention to simultaneously realise their advantageous effects.

The scope of protection of the present invention is given by the claims and is not limited by the features illustrated in the description or shown in the figures.

It is particularly obvious to a person skilled in the art that the invention can be used not only for laser cutting systems, but also for other machines and systems in production that require parts or components to be gripped. Furthermore, the components of the device or design unit can be produced so as to be distributed over several physical products.

The invention claimed is:

1. A computer-implemented method for calculating process parameters, being laser cutting parameters, which are machine and material specifically optimized for laser cutting a workpiece, being a sheet metal, with specific material properties by means of a laser machine with specific machine properties, comprising the method steps of:

Determining at least one of material of the workpiece and/or machine properties for which the process parameters are to be optimized;

Determining preconfigured initial process parameters;

Executing a re-optimization algorithm based on a statistical model accessed from a storage, and optimizing the process parameters based on the at least one of determined material of the workpiece and/or machine properties until a target objective function is achieved; and Controlling a laser cutting process for the workpiece with the optimized process parameters, wherein execution of the re-optimization algorithm comprises:

Controlling execution of test processes with the determined preconfigured initial process parameters;

Evaluating the test processes by using a measurement-based algorithm or a preference-based algorithm for determining preferences for the test processes; and Re-defining a parameter domain for the re-optimization algorithm based on the determined preferences.

2. The method according to claim 1, wherein the measurement-based algorithm is based on Bayesian Optimization using Gaussian Processes.

3. The method according to claim 1, wherein the preference-based algorithm is based on a pairwise comparison algorithm by comparing each of the test processes to select optimal test processes and wherein the determined preferences are implemented as constraints.

4. The method according to claim 1, wherein the material properties comprise at least one of a material type dataset and a thickness dataset.

5. The method according to claim 1, wherein evaluating the test processes is based on a standardized quality measure comprising a set of quality indices, which consists of slag residue, kerf width, burr height, perpendicularity of cutting edge, roughness, and/or robustness of the laser cutting process, in particular in dependence of a feed rate of a laser head.

6. The method according to claim 1, wherein determining the preconfigured initial process parameters is performed by selecting from a set of process parameters, parameters which are determined to be optimal for the same or for similar material properties as the determined material properties.

7. The method according to claim 1, wherein for re-defining the parameter domain, a physical model of the laser cutting process is used.

8. The method according to claim 1, wherein evaluating the test processes is based on generating a standardized quality metric for different types of sensor data, including in particular optical sensor data by means of using a set of optical sensors and/or diodes.

9. The method according to claim 1, wherein the re-optimization optimizes the target objective function is customer specific and wherein the target objective function include a maximization of at least one quality index of test processes, in particular, test cuts, a maximization of a feed rate of a laser head, and/or a minimization of power consumption of the laser machine.

10. The method according to claim 1, wherein the re-optimization algorithm continuously trains on the statistical model and not on a neural network model.

11. The method according to claim 1, wherein the re-optimization algorithm implements a closed loop control for automatically calculating re-optimized process parameters by learning a surrogate function, based on the determined preconfigured initial process parameters and results of the evaluated test processes.

12. The method according to claim 1, wherein the re-optimization algorithm uses a surrogate function to optimize the target objective function.

13. An optimization tool configured to execute a calculating of optimized machine and material specific process parameters including cutting parameters, for a laser cutting process for cutting a workpiece, being a sheet metal, to be executed on a laser machine having specific machine properties, the optimization tool comprising:

a property interface configured to receive at least one of determined material of the workpiece and machine properties for which the machine and material specific process parameters are to be optimized;

a parameter interface configured to receive preconfigured initial process parameters;

a processor configured to execute a re-optimization algorithm based on a statistical model accessed from a storage, and optimize the machine and material specific process parameters based on the at least one of determined material of the workpiece and machine properties until a target objective function is minimized or maximized;

an output interface configured to output the optimized machine and material specific process parameters to a controller of the laser machine, wherein the controller of the laser machine configured to control the laser cutting process for the workpiece with the optimized machine and material specific process parameters, wherein the processor comprises:

I. a controller configured to control execution of test processes with the determined preconfigured initial process parameters;

II. an evaluation module configured to evaluate the test processes by using a measurement-based algorithm or a preference-based algorithm for determining preferences for the test processes; and wherein the processor is further configured to re-define a parameter domain for the re-optimization algorithm based on the determined preferences of the evaluation module.

14. A non-transitory computer-readable medium storing a computer program comprising computer program code, that when executed by a processor, causes an optimization tool to:

determine at least one of material of a workpiece and machine properties for which process parameters are to be optimized by the optimization tool;

control a property interface configured to receive the at least one of determined material of the workpiece and machine properties for which the process parameters are to be optimized;

control a parameter interface configured to receive preconfigured initial process parameters;

control a processor configured to execute a re-optimization algorithm based on a statistical model accessed from a storage, and optimize the process parameters based on the at least one of determined material of the workpiece and machine properties until a target objective function is minimized or maximized;

control an output interface configured to output the optimized process parameters to a controller of a laser machine, wherein the controller of the laser machine configured to control a laser cutting process for the workpiece with the optimized process parameters, wherein the processor comprises:

I. a controller configured to control execution of test processes with the determined preconfigured initial process parameters;

II. an evaluation module configured to evaluate the test processes by using a measurement-based algorithm or a preference-based algorithm for determining preferences for the test processes; and wherein the processor is adapted to re-define a parameter domain for the re-optimization algorithm based on the determined preferences of the evaluation module.

* * * * *